United States Patent
Gaspardo

[11] Patent Number: 5,143,002
[45] Date of Patent: Sep. 1, 1992

[54] DEVICE TO STIR AND FEED SEEDS FOR PNEUMATIC DISTRIBUTORS OR SOWING MACHINES

[75] Inventor: Luigi Gaspardo, S.Vito al Tagliamento, Italy

[73] Assignee: Gasapardo SpA, Morsano Al Tagilamento (PN), Italy

[21] Appl. No.: 603,371

[22] Filed: Oct. 26, 1990

[30] Foreign Application Priority Data

Oct. 26, 1989 [IT] Italy .................. 83496 A/89

[51] Int. Cl.$^5$ .................. B65H 3/60; G01F 13/00
[52] U.S. Cl. .................. 111/185; 111/183; 222/226; 221/203
[58] Field of Search ............ 111/185, 170, 177, 183, 111/184, 34; 222/226, 220, 224, 225, 221; 221/200, 203, 211; 15/159 A; 172/45

[56] References Cited

U.S. PATENT DOCUMENTS

| | | | |
|---|---|---|---|
| 3,347,426 | 10/1967 | Morison, Jr. et al. | 222/352 |
| 3,741,311 | 6/1973 | Fleurant | 172/45 |
| 3,754,603 | 8/1973 | Bogie | 172/45 |
| 3,765,491 | 10/1973 | van der Lely et al. | 172/45 |
| 4,148,414 | 4/1979 | Parks, Jr. | 221/278 |
| 4,161,050 | 7/1979 | Sasaki et al. | 15/159 A |
| 4,220,184 | 9/1980 | Hallett et al. | 172/45 |
| 4,511,061 | 4/1985 | Gaspardo | 221/200 |
| 4,756,044 | 7/1988 | Clark | 15/159 A |
| 4,834,264 | 5/1989 | Siegel et al. | 221/200 |
| 4,896,615 | 1/1990 | Hood, Jr. et al. | 111/177 |

FOREIGN PATENT DOCUMENTS

| | | | |
|---|---|---|---|
| 2414287 | 8/1979 | France | 111/185 |
| 1519545 | 11/1989 | U.S.S.R. | 111/185 |
| 677842 | 8/1952 | United Kingdom | 111/183 |

*Primary Examiner*—Randolph A. Reese
*Assistant Examiner*—Spencer Warnick
*Attorney, Agent, or Firm*—Antonelli, Terry, Stout & Kraus

[57] ABSTRACT

Device to stir and feed seeds for pneumatic distributors of sowing machines, which is included in a first chamber (31) for the receipt of seeds (18), a continuously rotatable body (27) being included between a drive shaft (26) that sets in rotation a perforated disk (21) and the sidewall (35) of the first chamber (31), the rotatable body (27) comprising at least two substantially filiform, elongate, resilient projections (28) extending substantially so as to have to become substantially arcuate in order to be able to rotate together with the rotatable body (27), the projections (28) cooperating with a space (30) for the entry of seeds into the first chamber (31) for the receipt of seeds.

6 Claims, 1 Drawing Sheet

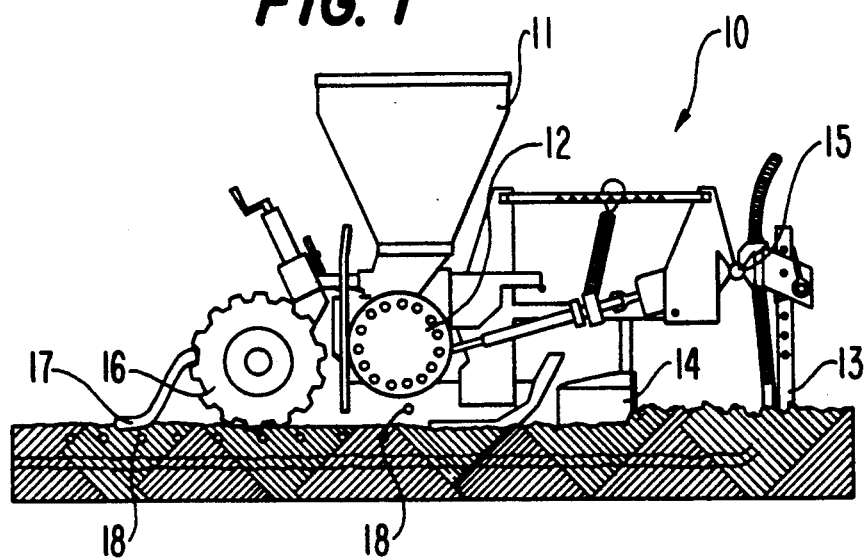
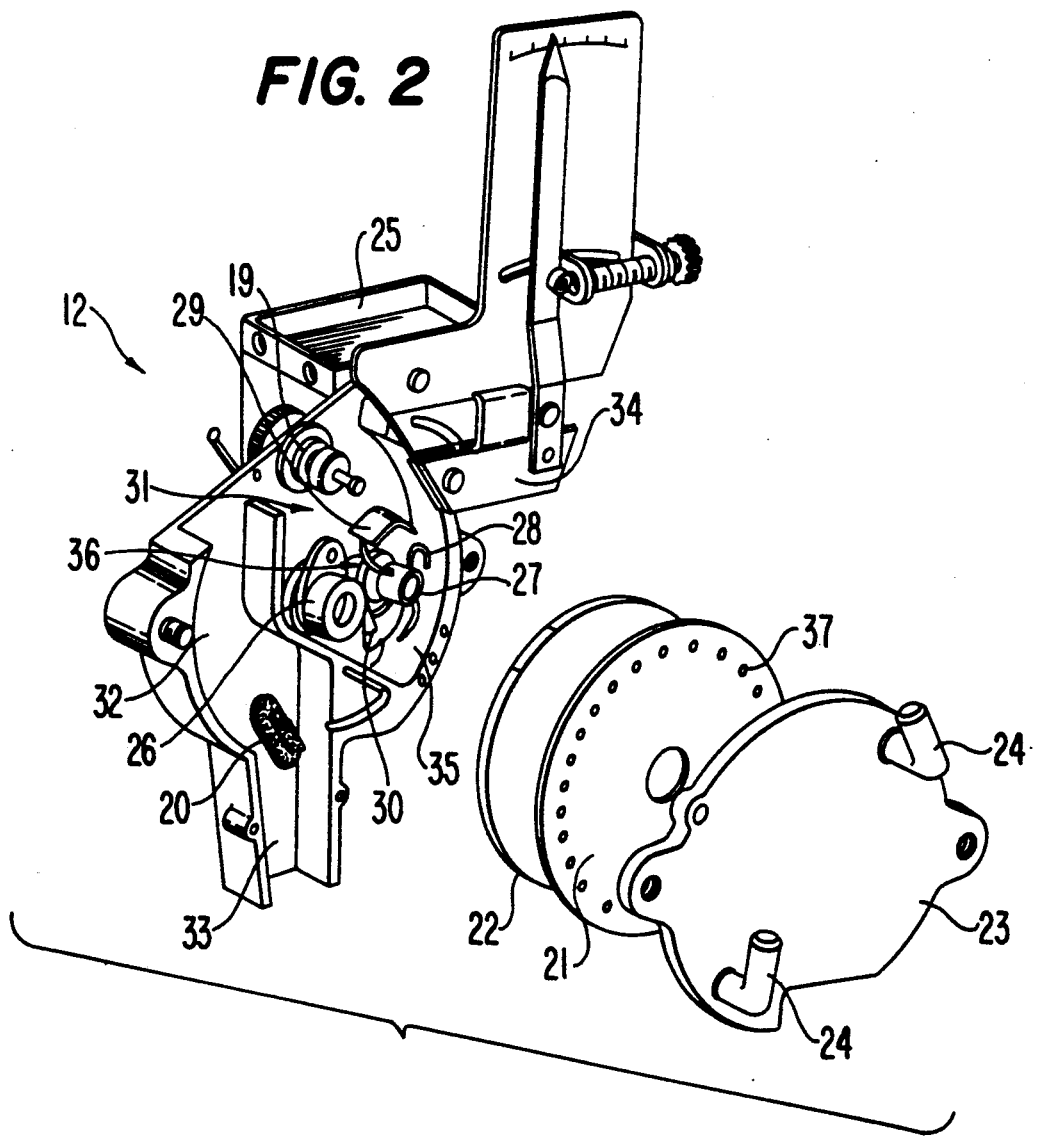

DEVICE TO STIR AND FEED SEEDS FOR PNEUMATIC DISTRIBUTORS OR SOWING MACHINES

This invention concerns a device to stir and feed seeds for pneumatic distributors of sowing machines.

The invention is applied advantageously in the case of the sowing of vegetable seeds and, more generally, in all cases where the seeds are very small or where the seeds tend to stick and couple together either by sticking or by reciprocal bonding of their hairs.

The invention therefore tends to provide a more efficient working of the sowing machines also in the case of especially small seeds and/or seeds which particularly stick and couple together and ensures a regular, accurate and even distribution on the ground.

In fact, one of the problems most often encountered during sowing is the regular and even distribution of the seeds on the ground, and this distribution is one of the most important factors in intensive cultivation where the ground available has to be used systematically.

For this reason it is necessary to deposit the seeds at regular intervals which can be varied according to the type of cultivation without leaving empty spaces and causing wastes.

In other words, it is necessary to carry out this depositing in most cases in such a way that the seeds are spread one by one in a constant manner without leaving empty spaces or depositing several seeds at the same time.

For this purpose sowing machines are employed which are equipped with pneumatic distributors comprising a pair of chambers positioned side by side and separated by a rotary disk, which can rotate about its own axis and is provided with a series of holes arranged along one or more circumferences.

The seeds are introduced into the first chamber, while a pressure lower than that in the first chamber is maintained in the second chamber; this is achieved by continuous aspiration of the air entering the second chamber. This negative pressure keeps the seeds pressed against the holes arranged along the circumference or circumferences of the rotary disk.

The shape of these chambers is such that this negative pressure is maintained along the whole circular path of the disk except for a given sector, so that, when the holes pass in front of this sector, the negative pressure is lacking and the seeds can fall freely and are then conveyed to or introduced into or deposited on the ground.

These devices entail drawbacks, especially in the case of small seeds which tend to become jammed in the holes of the disk and thus hinder the proper working of the machine.

Moreover, in the quite frequent case of hairy or oily seeds, the seeds tend to unite or stick together, so that one seed draws with it two or more seeds, which are therefore not deposited on the ground one by one but in groups, thus involving the resulting shortcoming of wastes and, in certain cases, of faulty depositing and an incomplete sequence.

To obviate this shortcoming and to ensure that in the first chamber there are no seeds coupled together in twos or more, the present applicant has designed and embodied a device in the past as disclosed in IT 109248 (U.S. Pat. No. 4,511,061).

This device is characterized in that it provides within the first chamber containing the seeds a rotary body equipped with flexible projections of a modest length and consistent width which slide in contact with the holes in the distributor disk.

This rotary body consists of a star-shaped element which is fitted so as to be able to idle on a stationary support and which has teeth made of a flexible material, this element is set in rotation periodically by pins solidly fixed to the rotary disk of the distributor; these pins engage the teeth of the star-shaped element momentarily during rotation of the perforated disk.

This device in itself has provided a considerable advantage, but this advantage is limited both in the case of fast modern sowing machine and in the case of seeds which by their nature are fragile or weak.

In fact, the pins solidly fixed to the rotary disk beat against the teeth of the rotary body and in certain cases squash the seeds lying between them and pulverize the seeds and make them inactive.

This fact is very unwelcome both because it causes empty spaces in the sown drills and because, owing to the cost of seeds, even a small fraction of ruined seeds entails heavy costs.

To avoid the above and to obtain further advantages which will become evident in the description that follows, the present applicant has designed, tested and embodied this invention.

This invention provides for a device to stir and feed seeds for pneumatic distributors of sowing machines according to the main claim, while the dependent claims describe variants of the idea of the solution.

The invention therefore provides for a device to stir and feed seeds which, by working in cooperation with the zone of entry of the seeds into the first chamber, acts mechanically on the seeds and walls of the chamber and eliminates the coupling of seed to seed and of seed to wall, so that the seeds are not only kept continuously stirred but are also kept single and are not coupled to other seeds, nor do they stick or cling to the walls. All of this is obtained with a fluid and non-violent stroking movement.

According to the invention a rotatable star-shaped body including two or more substantially filiform, elongate, flexible projections is provided in the first chamber where the seeds enter and in cooperation with the entry of the seeds and, in any event, also with the low part of the first chamber.

This rotatable body is kept constantly in rotation in coordination with the rolation of the distributor disk by a motion take-up positioned on the same shaft that sets the distributor disk in rotation.

The elongate, flexible projections have a considerable length, so that in cooperation with the sidewall of the first chamber they take up an arcuate form caused by that wall and by the rotation.

In cooperation too with the shaft from which they obtain their motion, these elongate, flexible projections have to bend and become arcuate, brushing the periphery of the shaft or of the support that guides and contains the shaft in their movement to pass over the shaft during rotation.

So as to improve and keep constant the actions of brushing, removal, mixing and separation, in a variant a deviator is provided in cooperation with the rotatable body and is placed between the sidewall and the drive shaft.

This deviator, besides causing the projections to bend and preventing a lashing action, may be suitable to thrust the projections towards the end wall of the chamber, which in this way is also constantly cleaned.

According to a further variant, at least the end part of the projections comprises some swollen or forked areas to enlarge the action of the projections themeselves.

According to another variant the projections are fastened to the rotatable body not along one single circumference but along parallel circumferences.

Let us now see a preferred embodiment of the invention with reference to the attached figures, which show a nonrestrictive example, in which:

FIG. 1 gives a side view of a body of a possible pneumatic sowing machine;

FIG. 2 gives a three-dimensional and partly knockdown view of an application of the invention so as to show the inside of the device.

A sowing machine may include one or more sowing assemblies 10 secured, for instance, to one bar 15 which serves to move the assemblies. A sowing assembly 10 comprises one or more of the following main units in conjunction with a sorting unit 12: a ploughshare 13, a compression wheel 16 and an earth leveller 17.

The sorting unit 12 receives seeds 18 from a hopper 11 in which the seeds are held in bulk, separates them and sends them one by one constantly Lo the ground, where the seeds 18 lie or are buried.

The sorting unit 12 comprises an attachment 25 for the hopper 11, a first chamber 31 whither the seeds arrive from the hopper 11 through a seed inlet space 30, and a second chamber (not shown here since in this case it is positioned at the back of a cover 23) which is kept at a negative pressure by aspiration provided through aspiration pipes 24.

A chamber 32 is also included for the falling of the seeds and cooperates with a seed delivery channel 33.

The aspiration action is not present in the second chamber (not shown) in correspondence with the chamber 32 for the falling of the seeds.

A perforated disk 21 is included between the first chamber 31 and second chamber (not shown) and comprises one or more series of holes 37 circumferentially; these holes 37 are sized in direct relationship with the type of seeds 18 which are to be sorted.

One or more sealing packings 22 may be included.

At least one primary sorter 34 and least one second fine sorter 19 are also comprised in cooperation with the first chamber 31 and the perforated disk 21.

A cleaner disk 20 may also be present in the chamber 32 for the falling of the seeds, and in the event of a plurality of series of holes 37 in the perforated disk 21 there may be included a partition means.

The perforated disk 21 can normally be replaced and is set in rotation by the drive shaft 26, which receives its motion in a known manner.

According to the invention a rotatable body 27 is included in the first chamber 31 in cooperation with the seed inlet space 30 and comprises two or more elongate, resilient projections 28.

Pairs or groups of projections 28 arranged on the same axis or in a spiral may also be provided; these projections 28, when the rotatable body 27 is rotated, scrape on the sidewall 35 and take on an arcuate shape so that a substantial part of the projections 28 rests against the sidewall 35. The same thing happens when the projections 28 scrape against the drive shaft 26.

This conformation of the projections 28 according to the tentacles of an octopus and, at the same time, this resulting arcuate curving of the same while they rotate, a curving resisted by the resilience and flexibility of the projections 28 themselves, have the effect that actions of mixing, separation, cleaning and feed are exerted.

To obviate that the projection 28 should leave the sidewall 35 and should be converted into a whip, a deviator 29 is provided which recreates the arcuate development and prevents the whip effect against the drive shaft 26.

This deviator 29, which may have a development according to an overturned "V" so as to improve its union with the projection 28, may also be conformed so as to thrust the projections so that they brush also against the end of the first chamber 31.

The rotatable body 27 is connected kinematically 36 to the drive shaft 26 and rotates constantly in cooperation with that shaft.

The kinematic chain may consist of a small belt 36, for instance of a toothed type, or a set of gearwheels, etc.

The kinematic chain is protected from contact with the seeds in the first chamber 31 by an appropriate protective cover or casing (not shown).

The rotatable body 27 may also be set in constant or substantially constant rotation by its own means.

I claim:

1. A device to stir and feed seeds for pneumatic distributors of sowing machines, comprising:
    a housing;
    a perforated disk mounted in said housing on a drive shaft, said perforated disk dividing an interior of said housing into at least a first chamber on one side of said perforated disk and a second chamber on another side of said perforated disk, said first chamber having a space for entry of seeds;
    a rotatable body mounted in said first chamber between said drive shaft and a sidewall of said housing, said rotatable body comprising at least two substantially filiform, elongate, resilient projections cooperating with said space for entry of seeds, wherein said projections take on a substantially arcuate form during rotation of said rotatable body so as to stir and separate seeds entering and within said first chamber, said projections have a length such that end portions of said projections scrape on said sidewall of said housing and on said drive shaft during rotation of said rotatable body; and
    means for continuously rotating said rotatable body.

2. A device according to claim 1, wherein said means for continuously rotating said rotatable body comprises a kinematic chain kinematically connecting said drive shaft to said rotatable body, and wherein said rotatable body is mounted for rotation about an axis parallel to said drive shaft.

3. A device according to claim 2, wherein said kinematic chain is a belt.

4. A device according to claim 1, further comprising a deviator mounted in said first chamber between said drive shaft and said sidewall for constraining said projections to take on an arcuate shape as they pass said deviator.

5. A device according to claim 4, wherein said deviator is shaped and positioned so as to thrust said projections against and end wall of said housing.

6. A device according to claim 1, wherein perforations are provided in said perforated disk circumferentially and wherein said device further comprises means for maintaining said second chamber under a reduced pressure except at a portion adjacent a seed delivering channel whereby seeds are kept singly at each of said perforations.

* * * * *